US010640616B2

United States Patent
Erdodi et al.

(10) Patent No.: US 10,640,616 B2
(45) Date of Patent: May 5, 2020

(54) WATERBORNE POLYAMIDE AND THEIR CHAIN EXTENSION WITH ISOCYANATES TO FORM CATIONIC WATERBORNE POLYUREAS DISPERSIONS

(71) Applicant: Lubrizol Advanced Materials, Inc., Cleveland, OH (US)

(72) Inventors: Gabor Erdodi, Macedonia, OH (US); John Ta-Yuan Lai, Broadview Heights, OH (US); Naser Pourahmady, Solon, OH (US)

(73) Assignee: LUBRIZOL ADVANCED MATERIALS, INC., Cleveland, OH (US)

( * ) Notice: Subject to any disclaimer, the term of this patent is extended or adjusted under 35 U.S.C. 154(b) by 4 days.

(21) Appl. No.: 15/535,797

(22) PCT Filed: Nov. 13, 2015

(86) PCT No.: PCT/US2015/060492
§ 371 (c)(1),
(2) Date: Jun. 14, 2017

(87) PCT Pub. No.: WO2016/099726
PCT Pub. Date: Jun. 23, 2016

(65) Prior Publication Data
US 2017/0335070 A1    Nov. 23, 2017

Related U.S. Application Data

(60) Provisional application No. 62/093,517, filed on Dec. 18, 2014.

(51) Int. Cl.
| | | |
|---|---|---|
| C08J 3/03 | (2006.01) | |
| C08G 18/08 | (2006.01) | |
| C08G 18/60 | (2006.01) | |
| C08G 18/75 | (2006.01) | |
| C08G 69/26 | (2006.01) | |
| C08G 69/34 | (2006.01) | |
| C08G 73/06 | (2006.01) | |
| C09D 11/102 | (2014.01) | |
| C09D 175/02 | (2006.01) | |
| C09D 175/12 | (2006.01) | |
| C09J 175/02 | (2006.01) | |
| C09J 175/12 | (2006.01) | |

(52) U.S. Cl.
CPC ............ C08J 3/03 (2013.01); C08G 18/0809 (2013.01); C08G 18/0814 (2013.01); C08G 18/603 (2013.01); C08G 18/758 (2013.01); C08G 69/265 (2013.01); C08G 69/34 (2013.01); C08G 73/0633 (2013.01); C09D 11/102 (2013.01); C09D 175/02 (2013.01); C09D 175/12 (2013.01); C09J 175/02 (2013.01); C09J 175/12 (2013.01); C08J 2375/02 (2013.01); C08J 2377/00 (2013.01); C08J 2377/06 (2013.01)

(58) Field of Classification Search
CPC ............... C08G 18/603; C08G 18/758; C08G 18/0814; C08G 69/265; C08G 69/34; C08G 73/0633; C08G 18/0809; C08K 5/5415; C08L 83/04; C08J 3/03; C08J 2375/02; C08J 2377/00; C08J 2377/06; C09D 175/12; C09D 11/102; C09D 175/02; C09J 175/12; C09J 175/02
See application file for complete search history.

(56) References Cited

U.S. PATENT DOCUMENTS

| | | | |
|---|---|---|---|
| 2,597,872 A | 5/1952 | Her | |
| 4,408,008 A * | 10/1983 | Markusch | .......... C08G 18/0804 156/331.7 |

FOREIGN PATENT DOCUMENTS

| | | |
|---|---|---|
| WO | 2014/126741 A2 | 8/2014 |
| WO | 2016/099726 A1 | 6/2016 |

OTHER PUBLICATIONS

Search Report of Corresponding International Application No. PCT/US2015/060492 dated Mar. 16, 2016.
Written Opinion of Corresponding International Application No. PCT/US2015/060492 dated Mar. 16, 2016.
Sergei G. Kazarian et al, "Specific Intermolecular Interaction of Carbon Dioxide with Polymers," Journal of the American Chemical Society, Jan. 1, 1996, pp. 1729-1736, vol. 118, No. 7.
Jerome D. Martinache et al, "Processing of Polyamide 11 with Supercritical Carbon Dioxide," Industrial & Engineering Chemistry Research, American Chemical Society, Dec. 10, 2001, pp. 5570-5577, vol. 40, No. 23.
Paolo Alessi et al, "Plasticization of Polymers with Supercritical Carbon Dioxide: Experimental Determination of Glass-Transition Temperatures," Journal of Applied Polymer Science, May 31, 2003, pp. 2189-2193, vol. 88, No. 9.
David L. Tomasko et al, "A Review of CO2 Applications in the Processing of Polymers," Industrial & Engineering Chemistry Research, American Chemical Society, Dec. 1, 2003, pp. 6431-6456, vol. 42, No. 25.

* cited by examiner

*Primary Examiner* — Patrick D Niland
(74) *Attorney, Agent, or Firm* — Teresan W. Gilbert; Vincent A. Cortese

(57) ABSTRACT

An improved process for forming polyamide dispersions in water utilizing carbon dioxide to facilitate dispersion of the polyamide is disclosed. The polyamides are generally below 30,000 or 40,000 g/mole molecular weight when dispersed, but can be chain extended with polyfunctional species such as polyisocyanates after dispersion. The dispersions are useful in coatings, adhesives, and inks. Composites and hybrids of these other polyamides with vinyl polymers are also disclosed and claimed.

20 Claims, No Drawings

WATERBORNE POLYAMIDE AND THEIR CHAIN EXTENSION WITH ISOCYANATES TO FORM CATIONIC WATERBORNE POLYUREAS DISPERSIONS

CROSS REFERENCE TO RELATED APPLICATION

This application is a national phase entry under 35 U.S.C. 371 of PCT/US2015/060492 filed Nov. 13, 2015, which claims the benefit of U.S. Provisional Application No. 62/093,517 filed Dec. 18, 2014.

FIELD OF INVENTION

The invention relates to waterborne polymer cationic dispersions of polyamides (preferably having tertiary amide linkages), optionally chain extended with polyisocyanates. Carbon dioxide is added to the amine terminated polyamide prepolymers to help reduce the prepolymer viscosity to help facilitate the formation of small particle size dispersions with good colloidal stability. The polyamide can provide good solvent resistance, good elastomeric properties, resistance to UV radiation, hydrolysis resistance, etc.

BACKGROUND OF THE INVENTION

EP 595281(A2) to BASF published May 4, 1994 and teaches a water dispersible ionic and nonionic polyamide modified polyurethane for use in automobile clearcoat and basecoat systems. The AU equivalent is AU 4903693.

EP595286(A1) to BASF published May 4, 1994 and interpreted based on AU-B-49162/93 teaches a solvent borne polyamide modified polyurethane resin for use in automotive clearcoat and basecoat.

"Novel Poly(urethane-amide)s from Polyurethane Prepolymer and Reactive Polyamides. Preparation and Properties", Polymer Journal, Vol. 34, No. 6, pp 455-460 (2002) describes a soluble polyamide containing aliphatic hydroxyl group in the backbone that were reacted with a polyurethane prepolymer with isocyanate groups that were endcapped with phenol. The polyamide and prepolymer were mixed together and cast on glass substrates. The cast films were treated with heat to release the phenol, thereby unblocking the isocyanates, which then reacted with the hydroxyl groups of the polyamide.

U.S. Pat. No. 7,276,570 assigned to Acushnet Company discloses compositions for golf equipment, such as golf balls comprising thermoplastic, thermoset, castable, or millable elastomer compositions comprising at least one polymer having a plurality of anionic moieties attached thereto. The compositions can be used as part of golf ball construction.

WO2006/053777 A1 to Novartis Pharma GmbH discloses crosslinkable poly(oxyalkylene) containing polyamide prepolymers that can be used to provide water-soluble prepolymers that can be used as a component in contact lenses.

US 2006/0047083A1 published Mar. 2, 2006 discloses triblock thermoplastic polymers of the ABA type wherein the A blocks represent hard segments such as urethane, urea, urethane-urea, or amide type segments and the B blocks represent soft segments such as aliphatic polyethers, aliphatic polyesters, poly(dimethylsiloxane)s, polyalkanes and their copolymers.

US2008/081870A1 (equivalent to EP 190577(A2)) to Bayer describes a size composition comprising polyurethane-polyurea repeat units with carboxylic amide containing repeat units. The backbone contains 0.75 to 10 wt. % C(O)—NH groups. The composition is used as a sizing for glass fibers used in nylon compositions.

U.S. Pat. No. 5,610,224 (equivalent to EP059581) to BASF discloses an ionic and nonionic polyamide modified polyurethane polymers for use in coating compositions, method for forming, and coating compositions containing these polymers.

US 2008/0223519 A1 (equivalent WO2008/070762 A1) assigned to Arizona Chemical Company discloses polyamide polyols and polyurethanes, methods for making and using and products made therefrom. It discloses reaction products of a polymeric and non-polymeric diamine with dicarboxylic acid and hydroxy substituted carboxylic acid. It also discloses reactions of the polyamide with diisocyanates.

"Polyurethane-Amide Hybrid Dispersions", Journal of Polymer Engineering, Vol. 29, Nos. 1-3, pp 63-78, 2009 describes aqueous polyurethanes with amide groups in the hard segments that were made by chain extending the prepolymer with various dicarboxylic acids. The particle size, mechanical and dynamic mechanical properties of cast films along with water swell and adhesion were studied.

WO2011/052707A1 titled Aqueous Polyamide Resin Dispersion, Method for Producing the Same, and Laminate discloses making a solvent dispersible polyamide for laminates.

US 2011/0124799 A1 to E. I. Du Pont de Nemours and Company describes inkjet inks for textiles containing crosslinked polyurethanes and further containing additional reactive components.

EP 449419 A1 describes reacting primary aminoalcohols with acid terminated polyamide ethers to create hydroxyl terminated polymers.

WO2014/126741 discloses polyamide dispersions in water that have superior properties over polyurethane dispersions. These use secondary amine containing monomers and result in tertiary amide linkages between the repeating units. These can use anionic, cationic, or nonionic dispersing moieties within the prepolymer.

SUMMARY OF THE INVENTION

This invention relates to hydrolysis resistant cationic polyamide polymers having cationic dispersing groups to make a dispersion in aqueous media comprising one or more polyamide segments. Preferred cationic species include tertiary amines salted with a volatile organic or inorganic acid and/or quaternized tertiary amines incorporated into the polyamide segments during synthesis of the polyamide. The polyamide can include polyether segments to help processability of the polyamide.

The process generally starts with a polyamide prepolymer that is synthesized with the tertiary amine therein. These prepolymers are usually limited to number average molecular weights between 500 and 50,000 g/mole so that they can be converted to a liquid (optionally with heat and/or solvents) as part of the process of dispersing the prepolymer in water. Typically, if a quaternized tertiary amine is desired, the tertiary amine is quaternized prior to incorporating it into the polyamide prepolymer. If the tertiary amine is to be salted with a volatile organic or inorganic acid, that process would typically happen after the tertiary amide was incorporated into the polyamide prepolymer but before the prepolymer was dispersed in water. Typically, one would want at least 1 milliequivalent of tertiary amine either in the form of a salt or quaternized (or combinations thereof) to facilitate dispersion in water.

An improvement over the prior art involves the use of carbon dioxide to help plasticize (and lower the viscosity of) the prepolymer to facilitate dispersion of the prepolymer material in water. While not wishing to be bound by theory, it is anticipated that the carbon dioxide complexes with the terminal primary or secondary amine groups of the prepolymer and reduces the polar interaction of the terminal amine groups with the amide linkages of the prepolymer. The complexes of the carbon dioxide and amine terminal groups also have some compatibility with water molecules, which can plasticize the prepolymer.

The carbon dioxide is also easily removed as a gas after the dispersion is made. The terminal amine groups can be regenerated when the carbon dioxide is partially or fully removed. The terminal amine groups can be reacted with other groups to either chain extend the prepolymer to higher molecular weights or to functionalize the prepolymer with reactive groups that can impart crosslinking or bonding characteristics to the prepolymer.

DETAILED DESCRIPTION OF THE INVENTION

Definitions: We will use the parentheses to designate 1) that the something is optionally present such that monomer(s) means monomer or monomers and (meth)acrylate means methacrylate or acrylate, 2) to qualify or further define a previously mentioned term, or 3) to list narrower embodiments.

The polymers and prepolymers of this disclosure are a technology extension of polyurethane dispersions by utilizing amide linkages in polyamide segments as macromonomers and potentially urea linkages to connect the amide segments into higher molecular weight polymers. The technology can be understood as a polyamide version of polyurethane dispersions in water made from chain extending a urethane prepolymer after dispersion in water.

The polyamide composition may contain small amounts of other polymers and materials either as physical blends or where the other polymers or materials are co-reacted into the prepolymer and/or polyurea. In one embodiment the polyamide prepolymers include polyether, e.g. poly($C_2$-$C_4$ alkylene oxide) in an amount from about 5 to about 50 wt. % of the weight of the prepolymer. These poly($C_2$-$C_4$alkylene oxide) polymers can have molecular weights from 250 to about 10,000 g/mole, more desirably from about 500 to about 5000 g/mole. These poly($C_2$-$C_4$ alkylene oxide) can be added as hydroxyl terminated oligomers and incorporated via ester linkages or can be added as amine terminated polymers and incorporated by amide linkages. The amine terminated poly($C_2$-$C_4$ alkylene oxide) are available from Huntsman as Jeffamine™ or Surfonamine™ products.

The term polyurea merely means a polymer with multiple urea linkages which can be accomplished by reacting amine terminated prepolymers with a polyisocyanate. The term polyamide oligomer will refer to an oligomer with two or more amide linkages, or sometimes the amount of amide linkages will be specified. A subset of polyamide oligomers will be telechelic polyamides. Telechelic polyamides will be polyamide oligomers with high percentages, or specified percentages, of two or more functional groups of a single chemical type; e.g., two terminal amine groups, meaning either primary, secondary, or mixtures; two terminal carboxyl groups; two terminal hydroxyl groups, again meaning primary, secondary, or mixtures; and two terminal isocyanate groups, meaning aliphatic, aromatic, or mixtures. Reactive amine terminated telechelic polyamides will be telechelic polyamide oligomers where the terminal groups are both amine types, either primary or secondary or mixtures thereof, e.g., generally excluding tertiary amine groups as the terminal reactive amine group.

Desirably, the polyamide prepolymer of this disclosure will have at least one amine terminal group, with the other terminus or termini if the polymer is branched being another species. In some more preferable embodiments the amine terminated polyamide prepolymer will have about 2 terminal amine groups (understanding that statistically not all chains can be guaranteed to have two terminal amine groups in a condensation polymerization). Desirably, said terminal amine groups are primary or secondary amine groups. Desirably, at least one of the terminal groups of each prepolymer is a secondary amine group. Desirably, at least 60, 70, 80, or 90 mole % of said amine terminal groups of said prepolymer are secondary amine terminal groups.

An improvement over the prior art involves the use of carbon dioxide to help plasticize and lower the viscosity of the prepolymer to facilitate dispersion of the prepolymer material in water. While not wishing to be bound by theory it is anticipated that the carbon dioxide complexes with the terminal primary or secondary amine groups of the prepolymer and reduces the polar interaction of the terminal amine groups with the amide linkages of the prepolymer. The complexes of the carbon dioxide and amine terminal groups also have some compatibility with water molecules, which can plasticize the prepolymer.

The carbon dioxide is also easily removed as a gas after the dispersion is made. The terminal amine groups can be regenerated when the carbon dioxide is partially or fully removed. The terminal amine groups can be reacted with other groups to either chain extend the prepolymer to higher molecular weights or to functionalize the prepolymer with reactive groups that can impart crosslinking or bonding characteristics to the prepolymer.

The carbon dioxide can be added to the polyamide prepolymer or to the water phase or to both. The stoichiometry of the number of moles of carbon dioxide to terminal amine groups doesn't require precise measurement. High pressure carbon dioxide or high pressure reactors are not required. Generally, a saturated solution or slightly supersaturated (with carbon dioxide) is sufficient to achieve the purpose. Thus, pressures of about 1 atmosphere or up to 2 atmospheres are generally sufficient. Desirably, at least 0.1, 0.2, 0.3 or 0.5 moles of carbon dioxide is present per mole of terminal amine groups in the prepolymer (either added to the prepolymer or to the water phase). More desirably about 1 mole of carbon dioxide is used per mole of terminal amine groups, and more preferably still a slight excess such as 1.5 or 2 moles of carbon dioxide per mole of amine terminal groups. Excess carbon dioxide can be released from the dispersion after formation of the dispersion in water. If the polyamide prepolymer is to be chain extended, the carbon dioxide volatilizes quickly enough that it doesn't interfere with chain extension.

In one embodiment, the cationic polyamide prepolymer is first colloidally dispersed in water in the presence of carbon dioxide and thereafter can be reacted with a polyfunctional component such as a polyisocyanate, defined as a molecule with two or more isocyanate groups. In preferred embodiments, the colloidal particles are characterized by their size and the polyamide is further characterized by its composition. A small amount of compatible solvent for the polyamide may be present. In one embodiment, ethylenically unsaturated monomers (such as free radically polymerizable monomers such as acrylic monomers) may be used in a solvent like function to reduce the prepolymer viscosity to facilitate dispersion in water (functioning as a plasticizer).

By analogy polyurethane dispersions are typically made by first making a moderate molecular weight prepolymer that is dispersed in an aqueous media. The urethane prepolymers are generally 5,000 g/mole to 100,000 g/mole. Simultaneous with dispersion or after dispersion, the prepolymers are generally chain extended to become urethane polymers of greater than 100,000 g/mole molecular weight.

The prepolymers and polymers made from polyamide segments generally have good solvent resistance. Solvents can deform and stress a polymer by swelling thereby causing premature failure of the polymer or parts from the polymer. Solvents can cause a coating to swell and delaminate from a substrate at the interface between the two. Adding polyamide to a polymer can increase adhesion to substrates that have similar or compatible surfaces to polyamides.

At this point it would be good to explain that many of the polyamides of the prior art are high melting point crystalline polyamides such as 6-nylon, 6,6-nylon, 6,10-nylon that melt at temperatures much too high, in excess of 100° C., to serve as soft segments if a blocky thermoplastic polymer is desired. In some of the prior art publications the polyamide, often a crystalline or high Tg polyamide type, was added merely to increase the surface interaction with a substrate that was compatible to polyamides. To create a lower Tg polymer soft, low Tg, polyester, polyether or polycarbonates were added to the polyamide segment to provide a lower composite Tg elastomeric segment. In other prior art publications, only a few polyamide linkages were inserted into a polymer to modify the polarity of the polymer to increase solvent resistance or raise the softening temperature.

One objective of the current patent application is to use high percentages of tertiary amide linkages in a prepolymer, achieve a good colloidally stable dispersion of the prepolymer in water, and thereafter form films or other masses from the prepolymer that have desirable properties, such as resistance to chain scission from a) hydrolysis and b) UV activated chain scission.

Some embodiments may allow for some linkages between repeat units to be other than amide linkages. An important modification from conventional polyamides to get low Tg polyamide soft segments is the use of monomers with secondary amine terminal groups in forming the polyamide. The amide linkage formed from a secondary amine and a carboxylic acid type group is called a tertiary amide linkage. Primary amines react with carboxylic acid type groups to form secondary amides. The nitrogen atom of a secondary amide has an attached hydrogen atom that often hydrogen bonds with a carbonyl group of a nearby amide. The intra-molecular H-bonds induce crystallinity with high melting point and act as crosslinks reducing chain mobility. With tertiary amide groups the hydrogen on the nitrogen of the amide linkage is eliminated along with hydrogen bonding. A tertiary amide linkage that has one additional alkyl group attached to it as compared to a secondary amide group, which has hydrogen attached to it, has reduced polar interactions with nearby amide groups when the polymer exists in a bulk polymer sample. Reduced polar interactions mean that glassy or crystalline phases that include the amide linkage melt at lower temperatures than similar amide groups that are secondary amide groups. One way to source secondary amine reactant, a precursor to tertiary amide linkages, is to substitute the nitrogen atom(s) of the amine containing monomer with an alkyl group. Another way to source a secondary amine reactant is to use a heterocyclic molecule where the nitrogen of the amine is part of the ring structure. Piperazine is a common cyclic diamine where both nitrogen are of the secondary type and part of the heterocyclic ring.

Another modification to reduce the Tg of the polyamide segments is from copolymers rather than homopolymers to disrupt uniformity along the polymer backbone. Thus, for a polyamide formed from a lactam polymerization such as from N-methyl-dodecyl lactam one would include an additional lactam, aminocarboxylic acid, diamine, or dicarboxylic acid in the monomers for the polymerization to change the spacing (among repeat units) between the amide linkages formed by the monomer so that the spacing between the amide linkages in the polyamide is irregular along the backbone, not the same physical dimension. For a polymerization of aminocarboxylic acid one would include additional lactam, aminocarboxylic acid, diamine, or dicarboxylic acid (with different physical length between the primary reactive groups of the monomer) in the monomer blend for the polymerization to change the spacing among repeat units between the amide linkages. Switching end groups on the monomers can also disrupt regularity in the spacing of the polar amide linkages and lower the effective Tg of the copolymer. Thus, co-polymerizing a $C_6$ amino carboxylic acid or lactam with a $C_6$ diacid and $C_6$ diamine can disrupt regularity of the amide linkages as the diacid and diamine units would switch the orientation of the amide linkage from head to tail orientation to tail to head orientation, slightly disrupting uniformity of spacing of the amide linkages along the polyamide backbone. Typically, when following this procedure one would try to add a disrupting monomer that increased or decreased the number of atoms between the amide forming end groups of the monomer(s) used as the primary monomer in the polyamide. One could also use a second disrupting monomer that had a cyclic structure (such as piperazine, a cyclic diamine monomer with where two methylene atoms form the top half of the ring and two methylene atoms form the bottom half of the ring) to disrupt the regularity of polyamide formed from a diacid reacted with a diamine monomer with two methylene atoms between the nitrogen atoms of the diamine.

Another way to express the use of a copolymerization method to reduce the Tg and consequently the hardness of the polyamide is that the polyamide is characterized as being within a, b or c a) when said amide linkages are derived from polymerizing one or more monomers and more than 90 mole % of said monomers are derived from polymerizing monomers selected from lactam and aminocarboxylic acid monomer then said polyamide is defined as a copolymer of at least two different monomers, meaning said monomers are characterized as being at least two different monomers because they have hydrocarbyl portion of different spacing length between the amine and carboxylic acid groups, wherein each of said at least two different monomers is present at molar concentrations of at least 10%, more desirably at least 20 or 30%, of the total lactam and/or aminocarboxylic acid monomers in said polyamide, or b) when said amide linkages are derived from polymerizing two or more monomers and more than 90 mole % of said monomers were derived from polymerizing dicarboxylic acid and diamine monomers then said polyamide is defined as a terpolymer of at least three different monomers (meaning said amide linkages are formed from at least three different monomers selected from the group of dicarboxylic acid and diamine monomers wherein said at least three different monomers are characterized as different from each other by a hydrocarbyl group of different spacing length between the carboxylic acid groups of the dicarboxylic acid, or different spacing length between the amine groups of the diamine, wherein each of said at least three different monomers is present at concentrations of at least 10 mole %, more desirably at least 20 or 30 mole %, of the total monomers in said polyamide), or c) with the proviso that if said amide linkages are derived from polymerizing a combination of dicarboxylic acid, diamine and either lactam and/or aminocarboxylic acid monomers such that the total dicarboxylic acid monomer(s) and the diamine monomer(s) are present at 10 mole % or more, more desirably 20 or 30 mole % or more, and the total lactam and aminocarboxylic acid monomers are present in the monomer blend at 10 mole % or more, more desirably 20 or 30 mole % or more, then there are no restrictions requiring additional different monomers.

We use the term low Tg, glass transition temperature, even though we realize the measured value would be dramatically affected by molecular weight of the prepolymers.

In one embodiment, the prepolymer will have a viscosity measured by a Brookfield circular disc viscometer with the circular disc spinning at 5 rpm of less than 100,000 cps at a temperature of 70° C., more desirably less than 15,000 or 10,000 cps at 70° C., still more desirably less than 100,000 cps at 60° C., and more preferably less than 15,000 or 10,000 cps at 60° C.; and still more preferable less than 15,000 or 10,000 cps at 50° C. Preferably these viscosities are neat prepolymers without solvents or plasticizers. These types of viscosities will facilitate dispersing the prepolymer as fine droplets in a continuous media to form a colloidally stable dispersion. In some embodiments, the prepolymer can be diluted with solvent or plasticizers to achieve viscosities in these ranges.

The term polyamide oligomer will refer to an oligomer with two or more amide linkages, or sometimes the amount of amide linkages will be specified. A subset of polyamide oligomers will be telechelic polyamides. Telechelic polyamides will be polyamide oligomers with high percentages, or specified percentages, of two functional groups of a single chemical type, e.g. two terminal amine groups (meaning either primary, secondary, or mixtures), two terminal carboxyl groups, two terminal hydroxyl groups (again meaning primary, secondary, or mixtures), or two terminal isocyanate groups (meaning aliphatic, aromatic, or mixtures). Ranges for the percent difunctional that are preferred to meet the definition of telechelic are at least 70 or 80, more desirably at least 90 or 95 mole % of the oligomers being difunctional as opposed to higher or lower functionality. Reactive amine terminated telechelic polyamides will be telechelic polyamide oligomers where the terminal groups are both amine types, either primary or secondary and mixtures thereof, i.e. excluding tertiary amine groups.

Many of the oligomers, telechelics, and polymers of this specification are made by condensation reactions of reactive groups on desired monomer(s). The condensation reaction of reactive groups will be defined as creating chemical linkages (typically covalent) between the monomers. The portion of the monomer that is incorporated into the oligomer or polymer will be defined as the repeat unit from the particular monomer. Some monomers, such as aminocarboxylic acid, or one end of diacid reacting with one end of a diamine, lose one molecule of water as the dicarboxylic acid and amine groups of the terminal groups of the monomers become an amide linkage. Other monomers, such as lactams, isocyanates, amines reacted with isocyanates, hydroxyl groups reacted with isocyanates, etc., do not release a portion of the molecule to the environment but rather retain all of the monomer in the resulting polymer.

We will define polyamide prepolymer as a species below 50,000 g/mole number average molecular weight, e.g. often below 40,000; 30,000; or 20,000 g/mole, that desirably has at least one and preferably about two terminal amine groups (desirably secondary amine groups) per prepolymer. Generally, the polyamide prepolymers will have a minimum number average molecular weight of at least 500 g/mole and more desirably at least 1,000 or 2,000 g/mole. Desired number average molecular weight ranges can be from 500 or 1000 to 40,000 or 50,000 g/mole, more desirably from about 1000 to 2000 to about 20,000 or 30,000. Desirably, the polyamide prepolymers will have at least one amide linkage per polyamide prepolymer and they will often have up to 100 amide linkages per prepolymer. Later we will define preferred percentages of amide linkages or monomers that provide on average one amide linkage per repeat unit in various oligomeric species. A subset of polyamide oligomer will be telechelic oligomer. The telechelic polyamide has molecular weight preferences identical to the polyamide oligomer above. The term telechelic has been earlier defined.

Generally, amide linkages are formed from the reaction of a carboxylic acid group with an amine group or the ring opening polymerization of a lactam, e.g., where an amide linkage in a ring structure is converted to an amide linkage in a polymer. In a preferred embodiment, a large portion of the amine groups of the monomers are secondary amine groups or the nitrogen of the lactam is a tertiary amide group. Secondary amine groups form tertiary amide groups when the amine group reacts with carboxylic acid to form an amide. For the purposes of this disclosure, the carbonyl group of an amide, e.g., in a lactam, will be considered as derived from a carboxylic acid group because the amide linkage of a lactam is formed from the reaction of carboxylic group of an aminocarboxylic acid with the amine group of the same aminocarboxylic acid. The formation of amides from the reaction of carboxylic acid groups and amine groups can be catalyzed by boric acid, boric acid esters, boranes, phosphorous acid, phosphates, phosphate esters, amines, acids, bases, silicates, and silsesquioxanes. Additional catalysts, conditions, etc., are available in textbooks such as "Comprehensive Organic Transformations," by Larock.

The polyamide prepolymer of this disclosure can contain small amounts of ester linkages, ether linkages, urethane linkages, urea linkages, etc., if the additional monomers used to form these linkages are useful to the intended use of the polymers. This allows other monomers and oligomers to be included in the polyamide to provide specific properties, which might be necessary and not achievable with a 100% polyamide segment oligomer. Sometimes added polyether, polyester, or polycarbonate provides softer, e.g., lower Tg, segments. Sometimes a polyether (e.g., amine terminated polyether) might be used as a segment or portion of a polyamide to reduce the Tg, or provide a soft segment, of the resulting polyamide oligomer. Sometimes a polyamide segment, e.g., difunctional with carboxylic acid or amine terminal groups, can be functionalized with two polyether end segments, e.g. from Jeffamine™ D230, to further lower the Tg of, or provide a soft segment in, the polyamide oligomer and create a telechelic polyamide with amine end groups.

As earlier indicated many amide forming monomers create on average one amide linkage per repeat unit. These include diacids and diamines when reacted with each other, aminocarboxylic acids, and lactams. When we discuss these monomers or repeat units from these monomers, we generally mean these monomers, their repeat units and their reactive equivalents (meaning monomers that generate the same repeat unit as the named monomer). These reactive equivalents might include anhydride of diacids, esters of diacids, etc. These monomers, when reacted with other monomers in the same group, also create amide linkages at both ends of the repeat units formed. Thus, we will use both mole percentages of amide linkages and weight percentages of amide forming monomers. Amide forming monomers will be used to refer to monomers that form on average one amide linkage per repeat unit in normal amide forming condensation linking reactions.

In one embodiment, desirably at least 10 mole %, more desirable at least 25, 30, 45, 50, 55, more desirably at least 60, 70, 75, 76, 80, 90, or 95 mole % of the number of the heteroatom containing linkages connecting hydrocarbon type linkages in the polyamide prepolymer are characterized as being amide linkages. Heteroatom linkages are linkages such as amide, ester, urethane, urea, ether linkages, where a heteroatom connects two portions of an oligomer or polymer that are generally characterized as hydrocarbons (or having carbon to carbon bond, such as hydrocarbon linkages). As the amount of amide linkages in the polyamide increases, the amount of repeat units from amide forming monomers in the polyamide increases.

In one embodiment, desirably at least 25 wt. %, more desirable at least 30, 40, 50, more desirably at least 60, 70, 80, 90, or 95 wt. % of the polyamide prepolymer is repeat units from amide forming monomers, also identified as repeat units from monomers that form amide linkages at both ends of the repeat unit. Such monomers include lactams, aminocarboxylic acids, dicarboxylic acid and diamines. In one embodiment, desirably at least 25 wt. %, more desirable at least 30, 40, or 50, more desirably at least 60, 70, 80, 90, or 95 wt. % of the polyamide prepolymer is tertiary amide forming monomers, also identified as repeat units from monomers that form tertiary amide linkages at the amine ends of the repeat unit. Such monomers include lactams with tertiary amide groups, aminocarboxylic acids with secondary amine groups, dicarboxylic acid and diamines where both amine terminal groups are secondary amines.

In one embodiment, desirably at least 50, 75, 76, 80, 90, or 95 mole percent of the number of the heteroatom containing linkages connecting hydrocarbon type linkages in the polyamide prepolymer are characterized as being tertiary amide linkages. In one embodiment, desirably at least 25, 50, 75, 76, 80, 90, or 95 mole percent of the linkages in the polyamide prepolymer are tertiary amide linkages. As earlier explained, tertiary amide linkages result from ring opening polymerization of lactams with tertiary amides or reactions of secondary amines with carboxylic acid groups.

Calculation of Tertiary Amide Linkage %:
The % of tertiary amide linkages of the total number of amide linkages was calculated with the following equation:

$$\text{Tertiary amide linkage \%} = \frac{\sum_{i=1}^{n}(w_{tertN,i} \times n_i)}{\sum_{i=1}^{n}(w_{totalN,i} \times n_i))} \times 100$$

where n is the number of monomers,
the index i refers to a certain monomer, $w_{tertN}$ is the average number nitrogen atoms in a monomer that form or are part of tertiary amide linkages in the polymerizations, (note: end-group forming amines do not form amide groups during the polymerizations and their amounts are excluded from $w_{tertN}$) $w_{totalN}$ is the average number nitrogen atoms in a monomer that form or are part of tertiary amide linkages in the polymerizations (note: the end-group forming amines do not form amide groups during the polymerizations and their amounts are excluded from $w_{totalN}$), and $n_i$ is the number of moles of the monomer with the index i.

Calculation of Amide Linkage %:
The % of amide linkages of the total number of all heteroatom containing linkages (connecting hydrocarbon linkages) was calculated by the following equation:

$$\text{Amide linkage \%} = \frac{\sum_{i=1}^{n}(w_{totalN,i} \times n_i)}{\sum_{i=1}^{n}(w_{totalS,i} \times n_i)} \times 100$$

where $w_{totalS}$ is the sum of the average number of heteroatom containing linkages (connecting hydrocarbon linkages) in a monomer and the number of heteroatom containing linkages (connecting hydrocarbon linkages) forming from that monomer polymerizations. "Hydrocarbon linkages" are just the hydrocarbon portion of each repeat unit formed from continuous carbon to carbon bonds (i.e., without heteroatoms such as nitrogen or oxygen) in a repeat unit. This hydrocarbon portion would be the ethylene or propylene portion of ethylene oxide or propylene oxide; the undecyl group of dodecyllactam, the ethylene group of ethylenediamine, and the $(CH_2)_4$ (or butylene) group of adipic acid.

Preferred amide or tertiary amide forming monomers include dicarboxylic acids, diamines, aminocarboxylic acids and lactams. Preferred dicarboxylic acids are where the alkylene portion of the dicarboxylic acid is a cyclic, linear, or branched (optionally including aromatic groups) alkylene of 2 to 36 carbon atoms, optionally including up to 1 heteroatom per 3 or 10 carbon atoms, more preferably from 4 to 36 carbon atoms (the diacid would include 2 more carbon atoms than the alkylene portion). These include dimer fatty acids (e.g. dimerized fatty acid from tall oil), hydrogenated dimer acid, sebacic acid, etc. Generally, we prefer diacids with larger alkylene groups as this generally provides polyamide repeat units with lower Tg value.

Preferred diamines include those with up to 60 carbon atoms, optionally including 1 heteroatom (besides the two nitrogen atoms) for each 3 or 10 carbon atoms of the diamine and optionally including a variety of cyclic, aromatic or heterocyclic groups providing that one or both of the amine groups are secondary amines, a preferred formula is

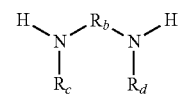

wherein $R_b$ is a direct bond or a linear or branched (optionally being or including cyclic, heterocyclic, or aromatic portion(s)) alkylene group (optionally containing up to 1 or 3 heteroatoms per 10 carbon atoms of the diamine) of 2 to 36 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being 1 or 2 to 4 carbon atoms. Such diamines include Ethacure™ 90 from Albermarle (supposedly a N,N'-bis(1,2,2-trimethylpropyl)-1,6-hexanediamine); Clearlink™ 1000 or Jefflink™ 754 both from Huntsman; N-methylaminoethanol; dihydroxy terminated, hydroxyl and amine terminated or diamine terminated poly(alkyleneoxide) where the alkylene has from 2 to 4 carbon atoms and having molecular weights from 100 to 2000; N,N'-diisopropyl-1,6-hexanediamine; N,N'-di(sec-butyl) phenylenediamine; piperazine; homopiperazine; and methyl-piperazine. Jefflink™754 has the structure

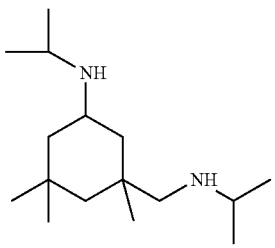 [SMILES: CC(C)NCC1(C)CC(NC(C)C)CC(C)(C)C1]

Clearlink™ 1000 has the structure

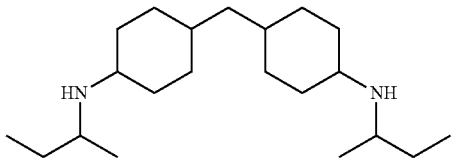 [SMILES: CCC(C)NC1CCC(CC2CCC(NC(C)CC)CC2)CC1]

Another diamine with an aromatic group is: N,N'-di(sec-butyl) phenylenediamine, see structure below:

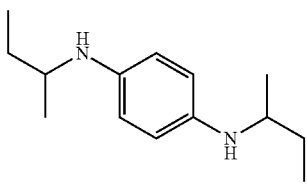 [SMILES: CCC(C)Nc1ccc(NC(C)CC)cc1]

Preferred diamines are diamines wherein both amine groups are secondary amines.

Preferred lactams include straight chain or branched alkylene segments therein of 4 to 12 carbon atoms such that the ring structure, without substituents on the nitrogen of the lactam, has 5 to 13 carbon atoms total (when one includes the carbonyl) and the substituent on the nitrogen of the lactam (if the lactam is a tertiary amide) is an alkyl of from 1 to 8 carbon atoms and more desirably an alkyl of 1 to 4 carbon atoms. Dodecyl lactam, alkyl substituted dodecyl lactam, caprolactam, alkyl substituted caprolactam, and other lactams with larger alkylene groups are preferred lactams as they provide repeat units with lower Tg values. Aminocarboxylic acids have the same number of carbon atoms as the lactams. Desirably the number of carbon atoms in the linear or branched alkylene group between the amine and carboxylic acid group of the aminocarboxylic acid is from 4 to 12 and the substituent on the nitrogen of the amine group (if it is a secondary amine group) is an alkyl group with from 1 to 8 carbon atoms, more preferably 1 or 2 to 4 carbon atoms. Aminocarboxylic acids with secondary amine groups are preferred.

In one embodiment, desirably at least 50 wt. %, more desirably at least 60, 70, 80 or 90 wt. % of said polyamide oligomer or telechelic polyamide comprise repeat units from diacids and diamines of the structure of the repeat unit being

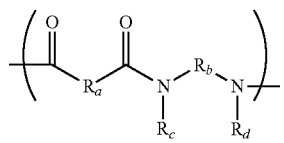

wherein $R_a$ is the alkylene portion of the dicarboxylic acid and is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion) and wherein $R_b$ is a direct bond or a linear or branched (optionally being or including cyclic, heterocyclic, or aromatic portion(s)) alkylene group (optionally containing up to 1 or 3 heteroatoms per 10 carbon atoms) of 2 to 36 or 60 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being an alkyl group of 1 or 2 to 4 carbon atoms.

In one embodiment, desirably at least 50 wt. %, more desirably at least 60, 70, 80 or 90 wt. % of said polyamide oligomer or telechelic polyamide comprise repeat unit units from lactams or amino carboxylic acids of the structure

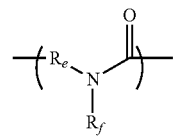

Repeat units can be in a variety of orientations depending on initiator type in the oligomer, derived from lactams or amino carboxylic acid wherein each $R_e$ independently is linear or branched alkylene of 4 to 12 carbon atoms and each $R_f$ independently is a linear or branched alkyl of 1 to 8 (more desirably 1 to 4) carbon atoms.

The above described polyamide oligomers and telechelic polyamide are useful to make prepolymers by reacting the polyamide oligomer or telechelic polyamide with polyisocyanates. Polyisocyanates will be used in this specification to refer to isocyanate containing species having two or more isocyanates groups per molecule. Desirably, the polyamide oligomers and telechelic polyamide have terminal groups reactive with isocyanates to form urea linkages and/or urethane linkages. Groups chemically reactive with isocyanates to form chemical linkages are known as Zerewitnoff groups and include primary and secondary amines and primary and secondary alcohols. The nitrogen of the primary or secondary amine bonds to a carbonyl of the isocyanate and a hydrogen from the primary or secondary amine moves from the amine and bonds to the NH group of the isocyanate. The oxygen of a primary or secondary alcohol bonds to the carbonyl of the isocyanate and a hydrogen from the hydroxyl group of the alcohol moves and bonds to the NH group of the isocyanate.

The molecular weight of the prepolymer can be increased (or it is sometimes referred to as chain extending the prepolymer into a urethane polymer) after the dispersion of prepolymer is made. This can be done by adding to the dispersion polyfunctional reactants, such as polyisocyanates or polyepoxides that can react with amine terminated prepolymers linking them into higher molecular weight species through covalent bonds of the amine terminal groups with the isocyanate or epoxy groups.

Dispersing species such as cationic species or cationic with nonionic species can desirably be added to the prepolymer such that the prepolymer can be dispersed in a continuous aqueous phase. These dispersing species help to provide colloidal stabilization to the dispersed phase. If surface active dispersing groups are to be incorporated into the polymer, it is desirable to include them in the reaction of the polyamide prepolymer (e.g. during the prepolymer preparation).

Polyamide prepolymers without ionic or nonionic species are not inherently water-dispersible. Therefore, at least one water-dispersability enhancing compound, i.e., a monomer with a dispersing functionality, which has at least one cationic or hydrophilic group is optionally included in the reactants for the prepolymers of this invention to assist dispersion of the prepolymer in water. Typically, this is done by incorporating a compound bearing at least one cationic group (and optionally separately adding a compound with a hydrophilic group/segment, e.g., a polyether side chain) or a group that can be made cationic, e.g., by chemical modifications such as neutralization, into the polymer/prepolymer chain. These compounds may be cationic (and optionally may include nonionic moieties). Cationic dispersible polyamide prepolymers based on tertiary amine groups desirably have from about 0.1 or 1 to about 15 or 20 milliequivalents of combined quaternized and/or salted tertiary amine groups/gram of prepolymer, more desirably from about 1, 2, or 3 to about 15 or 20 milliequivalents, or even 4, 5, 8 or 10 to about 15 or 20 milliequivalents/gram of prepolymer. By the term combined quaternized and/or salted tertiary amine groups it is meant either quaternized or salted with acid tertiary amines or combinations of the two species/gram of prepolymer. Sources of polyamines that can be reacted into the polyamide that carry at least one tertiary amine group include N-aminoethylpiperazine (AEP), dimethylaminopropylamine (DMAPA), aminopropylmorpholine, and tetramethyldipropylenetriamine. AEP is the only polyamine listed that has two reactive amine groups to copolymerize into the polyamide and one tertiary amide for enhancing water dispersability. The other amines listed would form tertiary amine terminal groups. An amine with an aromatic tertiary amine groups could be formed from reacting pyridine-4-carboxylic acid with one of the nitrogen atoms of diethylene-triamine (this would create a nicotinamide type compound). Other water-dispersibility enhancing compounds can also be reacted into the prepolymer backbone through urethane linkages or urea linkages, including lateral or terminal hydrophilic ethylene oxide or ureido units.

A group of nonionic water-dispersability enhancing compounds of particular interest are side chain hydrophilic monomers. Some examples include alkylene oxide polymers and copolymers in which the alkylene oxide groups have from 2-10 carbon atoms as shown, for example, in U.S. Pat. No. 6,897,281, the disclosure of which is incorporated herein by reference.

Water dispersability enhancing compounds can impart cationic nature onto polyurethane. Cationic polyurethanes contain cationic centers built into or attached to the backbone. Such cationic centers include ammonium, phosphonium and sulfonium groups. These groups can be polymerized into the backbone in the ionic form or, optionally, they can be generated by post-neutralization or post-quaternization of corresponding nitrogen, phosphorous, or sulfur moieties. The combination of all of the above groups can be used as well as their combination with nonionic stabilization. Examples of tertiary amine containing groups that have been reacted into polyurethanes include N-methyldiethanol amine and aminoalcohols available from Huntsman under Jeffcat® trade name such as DPA, ZF-10, Z-110, ZR-50 and alike. These hydroxyl functional groups could be incorporated into the polyamide prepolymer by reacting with the acid component of the polyamide forming ester linkages (under the right conditions of temperature and possibly with a catalyst). These amines and the earlier mentioned polyamines with tertiary amines therein can make salts with virtually any acid. Examples of acid include hydrochloric, sulfuric, acetic, phosphoric, nitric, perchloric, citric, tartaric, chloroacetic, acrylic, methacrylic, itaconic, maleic acids, 2-carboxyethyl acrylate and other. Quaternizing agents include methyl chloride, ethyl chloride, alkyl halides, benzyl chloride, methyl bromide, ethyl bromide, benzyl bromide, dimethyl sulfate, diethyl sulfate, chloroacetic, acids and alike. Examples of quaternized diols include dimethyldiethanolammonium chloride and N,N-dimethyl-bis(hydroxyethyl) quaternary ammonium methane sulfonate. Cationic nature can be imparted by other post-polymerization reactions.

Other suitable but less preferred water-dispersability enhancing compounds include thioglycolic acid, 2,6-dihydroxybenzoic acid, sulfoisophthalic acid, polyethylene glycol, and the like, and mixtures thereof.

(i) Polyisocyanate

Suitable polyisocyanates have an average of about two or more isocyanate groups, preferably an average of about two to about four isocyanate groups per molecule and include aliphatic, cycloaliphatic, araliphatic, aromatic, and heterocyclic polyisocyanates, as well as products of their oligomerization, used alone or in mixtures of two or more. Diisocyanates are more preferred.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl) cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate, and the like. Preferred aromatic polyisocyanates include 4,4'-diphenylmethylene diisocyanate and toluene diisocyanate.

Examples of suitable heterocyclic isocyanates include 5,5'-methylenebisfurfuryl isocyanate and 5,5'-isopropylidenebisfurfuryl isocyanate.

Polyamide compositions made by chain extension of waterborne polyamide dispersion form with high molecular weight polymer, e.g., number average molecular weight (Mn) greater than 100,000 g/mol, more desirably greater than 300,000 g/mole, and preferably greater than 500,000 g/mole with high solid content, e.g. 25-40 wt. %, with volume average particle diameters of less than 400 μm or more desirably less than 300 μm.

Good quality, clear, colorless (or very faint yellow color) polyamide polymers in the form of films can be formed from the dispersion. The films had high tensile strength, e.g., 35,000-55,000 psi, moderate elongation, e.g., 250-300%, films.

We made a series of polyamide oligomers from conventional difunctional acids and amines. These oligomers contained amine terminations and in reaction with diisocyanates form polyamide-polyurea backbone. The polyamide building blocks in our new dispersion polymers provide excellent hydrolytic stability, superior heat and UV resistance, and better overall mechanical properties in comparison to polyester and polyether segments. In addition, the amine chain termination in these polyamide oligomers forms urea linkages (vs. urethane link from polyol) in reaction with isocyanates. These polyurea linkages are known to have stronger intermolecular attractions that act more like a true crosslinked polymer, resulting in performance advantages over urethanes, including but not limited to better solvent resistance and elasticity.

Conventional Blends with Other Polymers

The dispersions of this invention can be combined with compatible polymers and polymer dispersions by methods well known to those skilled in the art. Such polymers, polymer solutions, and dispersions include those described in A. S. Teot. "Resins, Water-Soluble" in: Kirk-Othmer Encyclopedia of Chemical Technology. John Wiley & Sons. 3rd Edn., Vol. 20, H. F. Mark et al. Eds., pp. 207-230 (1982).

Composite Polymer Compositions (e.g. Polyurea/Urethane with Free Radically Polymerizable Monomers) Providing Better Interpenetration of Phases In one embodiment, one can use ethylenically unsaturated monomer(s) as a solvent to reduce the viscosity of the prepolymer during preparation and dispersion of the prepolymer or polyurea/urethane and subsequently polymerize the unsaturated monomer(s) to form a polymer. Ethylenically unsaturated monomers and other free radically polymerizable monomers can be polymerized by conventional free radical sources to form a polymer within the polyurea/urethane particle to form a composite polymer with the polyurea/urethane polyamide of the dispersion. Vinyl polymers is a generic term for polymers derived from substantial portions of unsaturated monomers or polymers derived from those monomers. Acrylic, often considered a subset of vinyl, will refer to acrylic acid, acrylates, being esters of acrylic acid, and alkacrylates, such as methacrylates and ethacrylates, and polymers therefrom. Additional free-radically polymerizable material, e.g., other unsaturated monomers, may be added to the vinyl or acrylic monomers to copolymerize. These other monomers can be monomers such as maleic anhydride, maleic acid, and other monomers where the carbon-carbon double bond is nearly as reactive (and copolymerizable with) as a ethylenically unsaturated monomers. Dienes are considered ethylenically unsaturated and copolymerize with both the broad category of vinyl monomers and narrow category of acrylic monomers.

The polymerization within the polyurethane particles can be done by forming the aqueous dispersions of polyurea/urethane composite and then polymerizing additional monomers by emulsion or suspension polymerization in the presence of these dispersions. Another way of making composite polymers is to include ethylenically unsaturated monomers in the polyurea/urethane prepolymer, e.g., either with the reactants to form the prepolymer and/or any time before the urethane prepolymer is dispersed, and cause these monomer to polymerize before, during and/or after the prepolymer is dispersed in aqueous medium. In one embodiment, the weight percent of polymer(s) from vinyl monomers based on 100 parts of combined urea/urethane and vinyl (or acrylic in narrower embodiments) will be at least 1, 5, or 10 weight percent with the complementary amount of urea/urethane prepolymer or polymer to make 100 parts by weight total. In another embodiment, where small amounts of urea/urethane prepolymer or polymer are desired, the urea/urethane prepolymer or polymer is at least 0.1, 0.5, 1, 5 or 10 weight percent of the combined weight and the vinyl (or acrylic in narrower embodiments) polymer is the complementary amount.

In one approach, the ethylenically unsaturated monomers act as a diluent (or plasticizer) during prepolymer formation. When the vinyl monomers are used as a diluent for the polyurea/urethane component then the vinyl monomers will be from about 5 or 10 weight percent to about 50 weight percent of the combined weight of the polyurea/urethane and vinyl component (monomer or polymer, depending on whether polymerization has occurred or not). Composites of polyurea/urethanes of this invention with and acrylics can be made by any of these approaches. In one embodiment, the telechelic polyamides with alcohol terminal groups are useful to form polyurethanes and polyurethane dispersions in water with lower processing temperatures and lower minimum film formation temperatures than similar polymer dispersions where secondary amino groups are in the position of the terminal hydroxyl groups. These can result in better films or the ability to incorporate more polyamide in a polymer dispersion or higher melting polyamide in a polymer dispersion.

Broadened Definition of Composite and/or Hybrid Polymer in Dispersion in Water

Composite and/or hybrid polymers dispersed in aqueous media (water) with significant amounts of polyamide segments therein have not been extensively disclosed in the literature and said composite and/or hybrid polymers can have desirable lower film formation temperature, better adhesion to some polar substrates, better elongation to break, better tensile strength, better retention of properties after aging, etc., than current urethane and/or polyamide compositions on the market. Composites and/or hybrid compositions can allow one to adjust the weight percentage of polyamide repeat units relative to other repeat units (e.g., optionally polyether, polycarbonate, polyester segments, polysiloxane, etc.) in the condensation polymer to optimize the modulus at a particular temperature or to move the minimum film formation temperature up or down by adding softer or harder polymer segments relative to the polyamide. Condensation polymer is a generic term for polymers made by coupling reactive groups like amine, carboxylic acid, isocyanates, hydroxyl, etc., in to form covalent chemical bonds (as opposed to free radical chain polymerizations). Composite and/or hybrid compositions also allow adjustment of the weight percentage of polyamide by increasing the weight percentage of vinyl polymer without increasing the amount of polyamide. Thus, this technology provides several ways to independently control the amount of polyamide in the composite particles, which can have effects on the polarity or hydrogen bonding of the composite particles, the surface tension of the composite particles, and/or the modulus, tensile strength, etc., of the composite polymer at a particular key temperature.

By the term composite and/or hybrid we intend to include a variety of mixtures of other polymers with a polyamide rich polymer type. A focus of this disclosure is ways to add polyamide segments to a polymer dispersion in water such that desirably features of polyamide can be achieved without some detrimental features such as high polymer processing temperatures. The polymers that contain polyamide segments may have other comonomers or comonomer segments linked directly or indirectly to the polyamide segments. These comonomers can include things like polyethers, polyesters, polycarbonates, polysiloxanes, etc. The composite and/or hybrid polymers of the composite and/or hybrid dispersions have approximately the same particle size ranges as disclosed for the polyamide dispersions in water.

The composite and/or hybrid polymer dispersions may have within the polymer comprising polyamide segments nonionic or cationic colloidal stabilizing groups as earlier disclosed for the polyamide dispersions in water.

In one embodiment, we disclose a composite and/or hybrid polymer dispersion in the form of dispersed hybrid polymer particles in aqueous medium, said composite and/or hybrid polymer dispersion comprising at least 5 wt. % (in some embodiments more desirably at least 10, 15, 20, 30 or 40 wt. %) of polyamide segments derived from amide forming condensation polymerization of monomers selected from diamines, amino carboxylic acids, lactams, and dicarboxylic acids, said wt. % based on the weight of said hybrid polymer dispersion in aqueous medium, said polyamide segments characterized as the entire weight of repeat units from said monomers having terminal amide linkage(s) at one or both ends of repeat units from said monomers. In a more preferred embodiment, said amide linkages are characterized as being at least 50, 70, 90, or 95 mole % amides linkages of the type formed from the reaction of a secondary amine with a carboxylic acid (i.e. a tertiary amide linkage). We note that lactam monomers forming tertiary amide linkages start out as tertiary amide linkages, ring open, and then form polymers with tertiary amide linkages. We intend the above language regarding amide linkage of the type formed from secondary amines reacted with carboxylic acid to include those derived from lactams with tertiary amide linkages.

The composite particles also comprise at least 5 wt. % (in some embodiments more desirably at least 10, 15, 20, 30 or 40 wt. %) of a vinyl polymer interspersed with said polyamide segments within the same polymer particles as said polyamide segments, wherein said vinyl polymer is derived from the free radical polymerization of one or more vinyl monomers in the presence of said polyamide segments (vinyl monomers being defined in this context as having at least alpha-beta unsaturation and desirably having from 3 to about 30 carbon atoms, including but not limited to (alk) acrylates, vinyl esters, unsaturated amides, acrylonitrile, dienes, styrene, AMPs monomer, etc.), and water. The water can be present in amounts from about 10, 20, or 30 weight percent of the polymer dispersion to about 70, 80, or 90 wt. % of the polymer dispersion. Typically, lower water content saves on shipping costs for the same amount of polymer but viscosity of the dispersions tends to rise when the water content is minimized.

In one embodiment, it is desirable that the polymer containing the polyamide segments be partially crosslinked to increase the physical properties of the polymer such as tensile strength and modulus. In one embodiment, the amount of ketone crosslinkable functional groups in the composite or hybrid polymer will be at least 0.05 milliequivalents per gram of said polymer dispersion, or up to about 1 milliequivalent, preferably from about 0.05 to about 0.5 milliequivalent, and more preferably from about 0.1 to about 0.3 milliequivalent per gram of said polymer dispersion. In that embodiment the ketone groups can be on the polyamide containing polymer or the vinyl polymer. In another embodiment, said composite or hybrid polymer dispersion has at least 10, 20, 30, 40 or 50 wt. % of said polyamide segments chemically bonded into polymers comprising on average one or more ketone groups per said polymer. In another embodiment said polymer dispersion further comprises hydrazine and/or hydrazide groups (sometimes in the form of low molecular weight species and sometimes in the form of polymers with hydrazide groups) in an amount from 10 mole % to about 200 mole % of hydrazine and/or hydrazide groups based on the moles of said ketone groups. This provides for a ketone chemical reaction with hydrazine forming a chemical bond that can function as chemical crosslinking. Typically, when adding hydrazine for crosslinking one doesn't use an excess of hydrazine because of potential undesirable reactions of hydrazine on humans. In one embodiment, the amount of hydrazine or hydrazide groups is desirably from about 20 to 100 mole % of the amount of ketone functional groups.

In one embodiment, said hydrazine and/or hydrazide groups are part of a reactive hydrazine or hydrazide compound of less than 400, 300 or 220 g/mole molecular weight (such as adipic acid dihydrazide). In another embodiment, said hydrazide groups are present and said hydrazide groups are part of a hydrazide reactive oligomeric or polymeric chemical compound of 300 or 400 g/mole to 500,000 g/mole molecular weight.

In another embodiment, said vinyl polymer comprises on average one or more (more desirably up to about 1 milliequivalent, preferably from about 0.05 to about 0.5 milliequivalent, and more preferably from about 0.1 to about 0.3 milliequivalent per gram of vinyl polymer on a dry vinyl polymer weight basis) ketone groups per vinyl polymer and said dispersion further comprises hydrazine and/or hydrazide groups in an amount from 10 mole % to about 200 mole % based on the moles of said ketone groups.

The ketone-hydrazine crosslinking described above is well known in the urethane and acrylic polymer dispersion art as effective crosslinkers for polymeric dispersions at around room temperature upon evaporation of volatile base and shift of the solution pH from slightly basic to neutral or pH acid. The author, Anthony D. Pajerski, has several patents on urethanes and related compounds in water crosslinked or increased in molecular weight by ketone-hydrazine crosslinking. This technology is also sometimes known as azomethine linkages.

Air-oxidizable, self-crosslinkable (unsaturation) crosslinkers can also be conveyed into the polymer of the composite or hybrid dispersion. The self-crosslinkable groups can be inserted into the polymer backbone via active hydrogen containing (isocyanate-reactive) unsaturated fatty acid ester polyol(s) (e.g., oil modified polyols) or polyamines. The resulting unsaturation in the polymer imparts air curable latent crosslinkability so that when a coating composition containing such a component is dried in the air (often in conjunction with a drier salt) the coating undergoes a self-crosslinking reaction. By isocyanate reactive is meant that the unsaturated fatty acid polyol or polyamine contains at least two hydroxyl or amine groups (containing active hydrogen atoms) that are available for reaction with the isocyanate groups on the polyisocyanate. They could generally produced by reacting a polyfunctional alcohol (polyol) or polyamine with a drying oil (glyceride) or a free fatty acid. The fatty acid component(s) of the drying oils and free fatty acids are characterized by containing at least one olefinic carbon-carbon double bond and can have two, three or more olefinic double bonds. The amount of unsaturated fatty acid ester polyol (or drying oil) to utilize will depend on many factors such as the degree of flexibility desired in the final composition and the nature and the amount of the other reactants used in the prepolymer formation as well as the degree and rate of air curing that is desired for the polymer.

The composite and/or hybrid polymer dispersion may further comprise from about 0.5 to about 10 wt. % of $C_1$ or $C_3$ to $C_{12}$ secondary alcohols based on the weight of said dispersion to function as simple hydrogen bonding donating components to the polyamide segments and soften or plasticize the composition (to enhance film formation at lower temperatures or lower viscosity during the dispersion process). The composite and/or hybrid polymer dispersion may also comprise alkylene oxide glycol ethers of less than 300 or 400 g/mole molecular weight in amounts of about 0.5 to about 10 wt. % of the polymer dispersion. The composite and/or hybrid polymer dispersion may also comprise nonionic or cationic surfactants to help colloidally stabilize the dispersion.

The composite and/or hybrid polymer dispersion may further comprising from about 1 to about 10 wt. % of a polysiloxane chemically bonded directly or indirectly to one or more of said polyamide segments. Polysiloxane polyols are characterized by the presence of the —Si($R_1$)($R_2$)—O— repeat units which can contain $C_1$-$C_3$-alkyl or aryl groups such as polydimethylsiloxanes, poly(dimethysiloxane-co-diphenylsiloxane)s, polydiphenylsiloxanes, poly(methylphenyl)siloxanes and the like, and combinations thereof. Examples include ethoxylated poly(dimethylsiloxane) (PDMS) Y-17256 from Momentive Performance Materials and side-chain PDMS diol MCR-C61 from Gelest. A composite and/or hybrid polymer dispersion according to earlier disclosures may further comprise urea and/or urethane linkages bonded directly or indirectly to one or more of said polyamide segments. This uses the polyamide segment (wherein a majority of amide linkages tertiary amide linkages as previously discussed) and the segments of polyamide are sometimes or often linked with urethane or urea linkages derived from reacting polyisocyanates with hydroxyl and/or amine groups. Thus, the polyamide segments would be chain extended by urethane or urea linkages. In one embodiment, where amine (primary or secondary) reactive groups are reacted with isocyanate groups, there are on average at least 4 urea linkages per every 20 amide linkages in said polymer.

Processes

Aqueous dispersions of polyurea/urethane particles are made in accordance with this invention by forming the polyamide prepolymer in the substantial absence of water (as water can react with amide linkages reforming the carboxylic acid and amine terminal groups), reacting in sufficient tertiary amine linkages to provide water dispersibility, and then dispersing this prepolymer in aqueous medium. This can be done in any of the methods known to the art. Typically, prepolymer formation will be done by bulk or solution polymerizing the ingredients of the prepolymer.

Once the polyamide prepolymer is formed, with dispersing moieties incorporated into said prepolymer, it is dispersed in an aqueous medium in the presence of carbon dioxide to form a dispersion or a solution. Dispersing the prepolymer in aqueous medium can be done by any conventional technique in the same way that polyurethane prepolymers made by bulk or solution polymerization are dispersed in water. Normally, this will be done by combining the liquid prepolymer blend with water with mixing. Where solvent polymerization is employed, the solvent and other volatile components can optionally be distilled off from the final dispersion, if desired. Where the prepolymer includes enough water-dispersibility enhancing compound, e.g., cationic and/or nonionic monomers, to form a stable dispersion without added emulsifiers (surfactants), the dispersion can be made without such compounds, i.e., substantially free of surfactants, if desired. The advantage of this approach is that the coatings or other products made from the polyurea/urethane without low molecular weight surfactants exhibit less water sensitivity, often better film formation and less foaming.

Other known ways of making aqueous polyurethane dispersions can also be used to make the dispersions of this invention. Their review can be found in several publications including by D. Dieterich in *Progress in Organic Coatings*, vol. 9, pp. 281-340 (1981). Examples of the processes include:

Shear Mixing—Dispersing the prepolymer by shear forces with emulsifiers (external emulsifiers, such as surfactants, or internal emulsifiers having anionic, nonionic, cationic and/or zwitterionic groups as part of or pendant to the polymer backbone, and/or as end groups on the polymer backbone).

Acetone process—A prepolymer is formed with or without the presence of acetone, MEK, and/or other polar solvents that are non-reactive with prepolymer and the other reactants and easily distilled. The prepolymer is further diluted in said solvents as necessary, and chain extended if desired and the solvents are distilled off. A variation on this process would be to chain extend the prepolymer after its dispersion into water.

Continuous process polymerization—A prepolymer with water dispersing groups is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer, water, and optional chain extender and/or surfactant.

Reverse feed process—Water and other reactants, e.g., carbon dioxide and an optional acid to salt the tertiary amine are charged to the prepolymer under agitation. The prepolymer can be neutralized before water and/or chain extender is added.

Additives and Applications

Because the polyamide and optional urea linkages have higher softening temperatures than polyethers, polyesters, and urethane linkages, it is desirable to include coalescing aids in the prepolymers and polymer dispersions of this disclosure to help promote coalescence at the desired temperature of the polymer particles with each other and with any solid additives in the compositions. Coalescing aids can also be known as solvents or plasticizers, depending on their function. One coalescing aid is the vinyl monomers earlier discussed with composite polymer blends. Preferred vinyl monomers include methyl methacrylate, butyl acrylate, ethylhexyl acrylate, ethyl acrylate and styrene. Coalescing solvents include diethylene glycol dimethyl ether, dipropylene glycol dimethyl ether, dimethylcarbonate, isopropyl alcohol, dibutylene glycol dimethyl ether, and Texanol (isobutyric ester of 2,2,4-trimethyl-1,3-pentanediol).

Crosslinkers

Compounds having at least one crosslinkable functional group can also be incorporated into the polyurea/urethane of the present invention, if desired. Examples of such compounds include those having carboxylic, carbonyl, amine, hydroxyl, epoxy, acetoacetoxy, olefinic and hydrazide groups, blocked isocyanates, and the like, and mixtures of such groups and the same groups in protected or blocked forms which can be reversed back into original groups from which they were derived. Other suitable compounds providing crosslinkability include thioglycolic acid, 2,6-dihydroxybenzoic acid, melamine and its derivatives, multivalent metal compounds and the like, and mixtures thereof.

The amount of optional compounds having crosslinkable functional groups in the prepolymer will typically be up to about 1 milli-equivalent, preferably from about 0.05 to about 0.5 milli-equivalent, and more preferably from about 0.1 to about 0.3 milli-equivalent per gram of final polyurethane on a dry weight basis.

Other additives well known to those skilled in the art can be used to aid in preparation of the dispersions of this invention. Such additives include surfactants, stabilizers, defoamers, thickeners, leveling agents, antimicrobial agents, antioxidants, UV absorbers, fire retardants, pigments, dyes, and the like. These additives can be added at any stage of the manufacturing process.

The dispersions of this invention typically have total solids of at least about 20 weight percent in one aspect, at least about 30 weight percent in another aspect, and at least about 40 weight percent in a further aspect, and about 45 weight percent in still another aspect, based on the weight of the total coating composition.

As coating compositions or adhesives, they may be applied to any substrate including wood, metals, glass, cloth, leather, paper, plastics, foam and the like, by any conventional method including brushing, dipping, flow coating, spraying, and the like.

The compositions of the present invention and their formulations are useful as self-supporting films, coatings on various substrates, or adhesives with longer useful lifetimes than similar polyurethane compositions or other improved properties.

WORKING EXAMPLES

In these examples, the following reagents were used: H12MDI-1,1'-methylenebis-(4-isocyanato cyclohexane) from Bayer Corporation as Desmodur® W.

Santisizer™-148 plasticizer: isodecyl diphenyl phosphate available from Ferro.

Example A the following components were reacted together under vacuum for 1 hour at 160° C., 1 hour at 170° C., and for 6 hours at 220° C. to form a prepolymer with a tertiary amine group.

TABLE 1

| Component | Amount | Mn |
|---|---|---|
| Dimeric acid | 631.4 g | 560.9 |
| Sebasic acid | 89.24 | 202.0 |
| Dodacadionic acid | 87.1 | 230.3 |
| Piperazine | 108.6 | 86.1 |
| Aminoethylpiperazine | 114.5 | 129.1 |
| Piperazine | 38.5 | 86.1 |

Then 46.8 grams of Example A was reacted with 8.89 g or H12MDI at elevated temperature in a 250 mL reactor to form an isocyanate terminated prepolymer. The reactants were cooled to room temperature and 2.40 g of Santisizer™-148 was added dropwise. Then the reactants were heated and stirred at 55° C. and the NCO was monitored. Then 1.92 g of acetic acid was added to salt the tertiary amine group to promote dispersion in water. Then the reactants were dispersed in 135.7 grams of warm water and $CO_2$. The carbon dioxide facilited the dispersion of the isocyanate terminated prepolymer in water. Then 2.33 grams of adipic acid dihydrazide was added to chain extend the prepolymer. A useful dispersion of the polyamide/urea in water was obtained.

Each of the documents referred to above is incorporated herein by reference. Except in the Examples, or where otherwise indicated, all numerical quantities in this description specifying amounts, reaction conditions, molecular weights, number of carbon atoms, etc., are to be understood as modified by the word "about." Unless otherwise indicated, all percent and formulation values are on a molar basis. Unless otherwise indicated, all molecular weights are number average molecular weights. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. All of the embodiments of the invention described herein are contemplated from and may be read from both an open-ended and inclusive view (i.e., using "comprising of" language) and a closed and exclusive view (i.e., using "consisting of" language). As used herein parentheses are used designate 1) that the something is optionally present such that monomer(s) means monomer or monomers or (meth)

acrylate means methacrylate or acrylate, 2) to qualify or further define a previously mentioned term, or 3) to list narrower embodiments.

While certain representative embodiments and details have been shown for the purpose of illustrating the subject invention, it will be apparent to those skilled in this art that various changes and modifications can be made therein without departing from the scope of the subject invention.

What is claimed is:

1. A process to make a polyamide cationic dispersion in water comprising:
    a) providing a polyamide prepolymer with a number average molecular weight from about 500 to about 50,000 g/mole having at least one terminal primary or secondary amine groups and at least 0.1 milliequivalents of cationic dispersing groups selected from salted tertiary amine and quaternized tertiary amine group(s) per gram of said prepolymer;
    b) dispersing said polyamide prepolymer in water using the cationic dispersing groups; and
    c) utilizing at least 0.1 equivalents of $CO_2$ per equivalent of total amines selected from primary and secondary amine terminal groups and water to plasticize said polyamide prepolymer during the dispersing step.

2. The process of claim 1, further comprising a step of chain extending said amine terminated polyamide dispersion in water with a polyisocyanate to a number average molecular weight in excess of 100,000 g/mole.

3. The process of claim 1, wherein said polyamide prepolymer comprises multiple amide linkages and wherein at least 50 mole % of the polyamide linkages are tertiary amide linkages.

4. The process of claim 1, including from about 5 to about 50 wt. % of poly($C_2$-$C_4$ alkylene oxide) segments copolymerized into said amine-terminated polyamide.

5. The process of claim 1, wherein said $CO_2$ is added to the polyamide prepolymer before the amine terminated polyamide prepolymer is dispersed in water.

6. The process of claim 1, wherein said $CO_2$ is added to the water phase that the polyamide prepolymer is dispersed in.

7. A process for dispersing an amine-terminated prepolymer of number average molecular weight from about 500 to about 50,000 g/mole in a water solution comprising:
    a) providing a primary or secondary amine terminated prepolymer having at least 0.1 milliequivalents/gram of cationic dispersing groups selected from salted tertiary amines and quaternized tertiary amines; and
    b) dispersing said amine-terminated prepolymer in water with the aid of at least 0.1 equivalents of $CO_2$ per equivalent of amine-terminal groups on said amine terminated prepolymer, wherein said $CO_2$ and water present reduce the viscosity of the prepolymer phase such that it is easier to form smaller diameter, more colloidally stable dispersions of said prepolymer, than without said $CO_2$.

8. The process of claim 7, further comprising a step of chain extending said amine terminated polyamide dispersion in water with a polyfunctional reactant that can condense with said amine terminal groups to form a chemical bond, to increase the number average molecular weight of the resulting polymer to be in excess of 100,00 g/mole.

9. The process of claim 8, wherein said polyfunctional reactant is a polyisocyanate.

10. The process of claim 7, wherein sufficient cationic dispersing groups and sufficient $CO_2$ are used such that a prepolymer dispersion with a volume average particle diameter of less than 400 nanometers is formed.

11. The process of claim 10, wherein said volume average particle diameter is less than 300 nanometers.

12. The process of claim 7, wherein said amine terminated prepolymer also comprises from about 5 to about 50 wt. % of poly($C_2$-$C_4$ alkylene oxide) segments copolymerized into said prepolymer.

13. The process of claim 8, wherein at least 50 mole % of said amine terminal groups are secondary amine terminal groups.

14. The process of claim 13, wherein at least 70 mole % of said amine terminal groups are secondary amine terminal groups.

15. The process of claim 7, wherein at least 1 equivalent of $CO_2$ groups are present per equivalent of amine terminal groups in said dispersing step.

16. The process of claim 7, wherein said amine terminated prepolymer comprises at least 20 wt. % of repeating units with amide linkages attached to adjacent repeat units with amide linkages.

17. The process of claim 7, wherein at least 60 mole % of said amide linkages linking said repeat units are tertiary amide linkages derived from reacting a secondary amine with a carboxylic acid.

18. A composition comprising the reaction product of claim 2.

19. The composition of claim 18, wherein said reaction product further includes a crosslinker or a coalescent.

20. The composition of claim 18, used in an ink, coating, or adhesive.

* * * * *